United States Patent [19]

Barnes

[11] Patent Number: 5,642,807
[45] Date of Patent: Jul. 1, 1997

[54] ARTICLE EMPLOYING MODIFIED MUSICAL RECORDING TAPE CARTRIDGE STORAGE CASE FOR STORING SMALL LOOSE ITEMS

[76] Inventor: George W. Barnes, 1701 E. 3rd, Hutchinson, Kans. 67502

[21] Appl. No.: 589,816

[22] Filed: Jan. 22, 1996

Related U.S. Application Data

[63] Continuation-in-part of Ser. No. 395,054, Feb. 27, 1995, abandoned.

[51] Int. Cl.$^6$ .................................................. A45C 11/32
[52] U.S. Cl. .................. 206/38.1; 206/38; 206/751; 220/342; 220/523; 220/526; 220/555
[58] Field of Search ..................... 206/38, 38.1, 387.1, 206/379, 751; 220/337, 342, 523, 526, 553, 555

[56] References Cited

U.S. PATENT DOCUMENTS

| | | | |
|---|---|---|---|
| 2,637,884 | 5/1953 | Morehouse | 24/81 |
| 3,009,187 | 11/1961 | Barba et al. | 220/553 |
| 3,187,396 | 6/1965 | Carroll | 24/115 |
| 3,272,325 | 9/1966 | Schoenmakers | 206/387 |
| 3,407,636 | 10/1968 | Kovacevic | 70/456 |
| 3,532,211 | 10/1970 | Gellert | 206/387.1 |
| 3,587,262 | 6/1971 | Kaye | 70/456 |
| 3,677,044 | 7/1972 | De Frees | 70/456 |
| 3,754,639 | 8/1973 | Gellert | 206/387 |
| 3,960,270 | 6/1976 | May | 220/523 |
| 4,048,824 | 9/1977 | Blackmon | 70/456 |
| 4,385,693 | 5/1983 | Gelardi et al. | 206/387.1 |
| 4,527,690 | 7/1985 | Schmidts et al. | 206/387 |
| 4,912,814 | 4/1990 | McKenzie | 24/115 |
| 5,121,834 | 6/1992 | Tissembaum | 206/38.1 |
| 5,168,998 | 12/1992 | Satoh et al. | 206/387.1 |
| 5,535,882 | 7/1996 | Liu | 206/379 |

FOREIGN PATENT DOCUMENTS

| | | | |
|---|---|---|---|
| 242079 | 8/1965 | Austria | 206/379 |
| 1034848 | 7/1966 | United Kingdom | 206/387.1 |
| 2182640 | 5/1987 | United Kingdom | 206/387.1 |

*Primary Examiner*—David T. Fidei
*Attorney, Agent, or Firm*—John R. Flanagan

[57] ABSTRACT

A novelty article for storing small loose items employs a modified musical recording tape cartridge storage case which may contain an insert cart displaying a favorite recording artist of the user. The modified case includes a lid defined by a main front wall and an auxiliary back wall interconnected to and spaced from an end portion of the main front wall by a pair of side walls and an end wall so as to define a pocket along one end of the lid, and a body defined by an end wall and a pair of side walls and a main front wall connected to and extending outwardly from the end wall and connected to and extending between the side walls. The main back wall is relieved so as to define a void at an open end of the body. With the lid and body disposed in a closed position relative to one another, the auxiliary back wall of the lid lies in the void in a coplanar relationship with the main back wall of the body and the end wall of the lid closes the open end of the body. Also, an elongated enclosed compartment is provided on the lid extending from the pocket therein to an open end located adjacent to and along an opposite end of the lid opposite from the one end thereof.

16 Claims, 2 Drawing Sheets

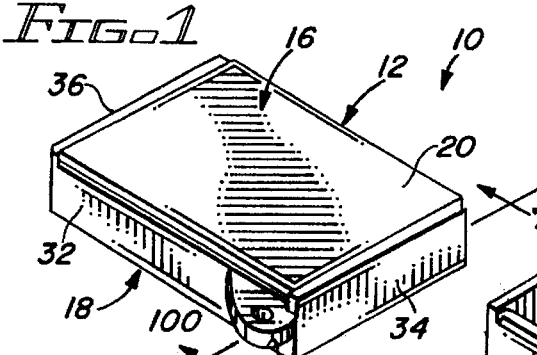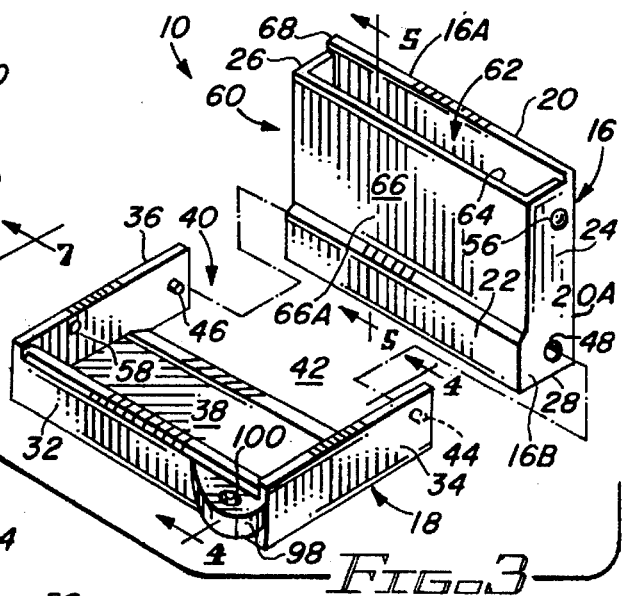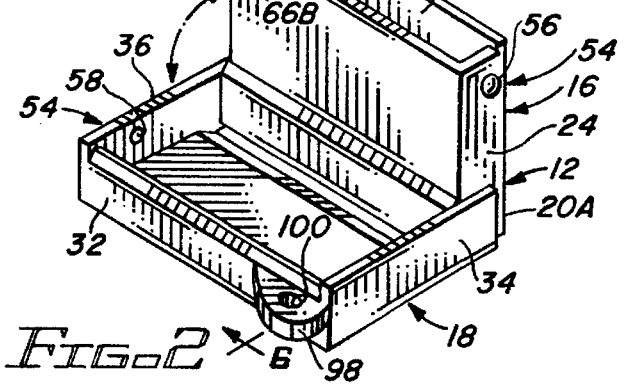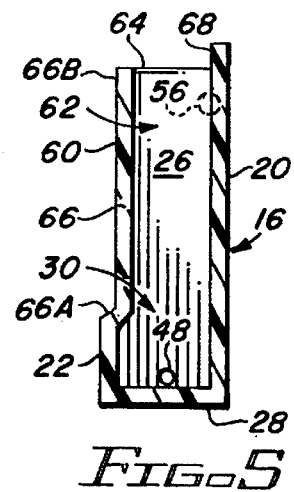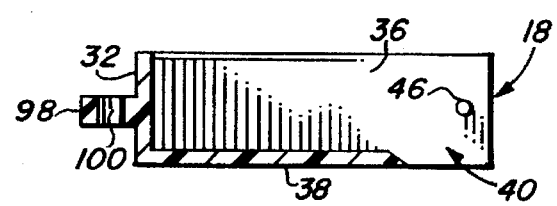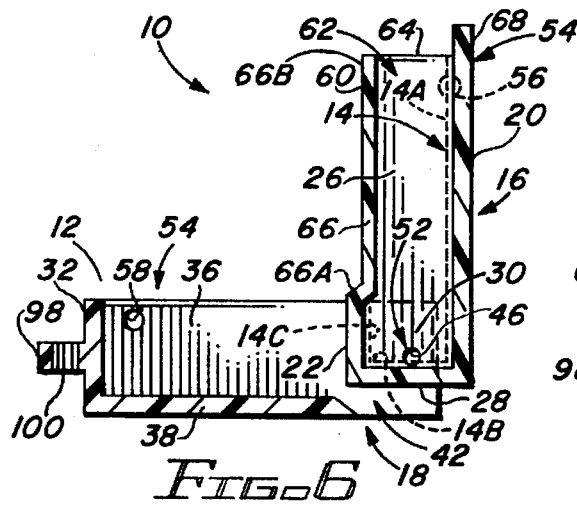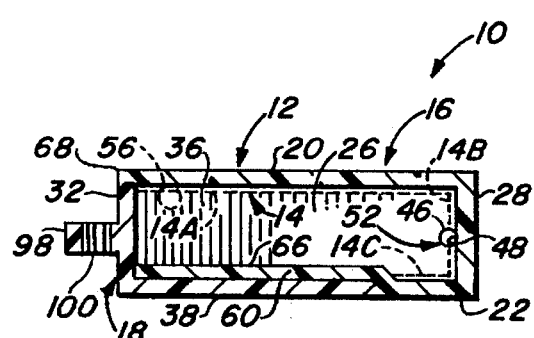

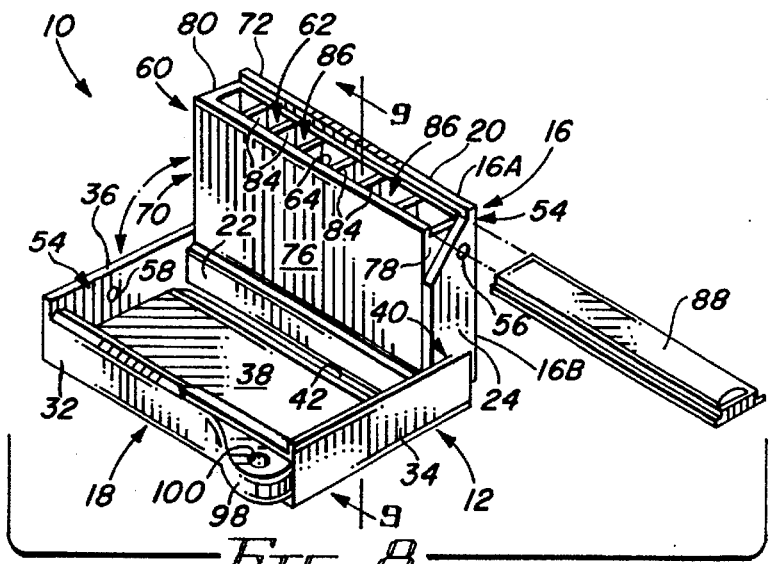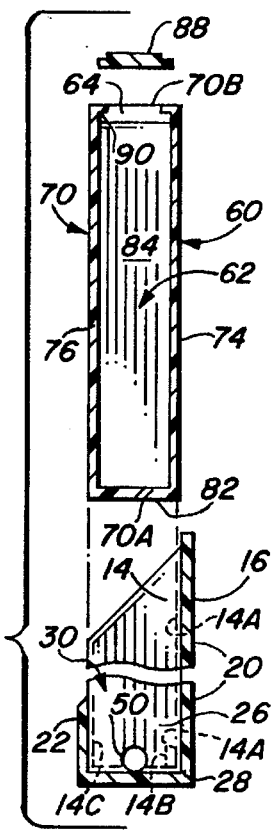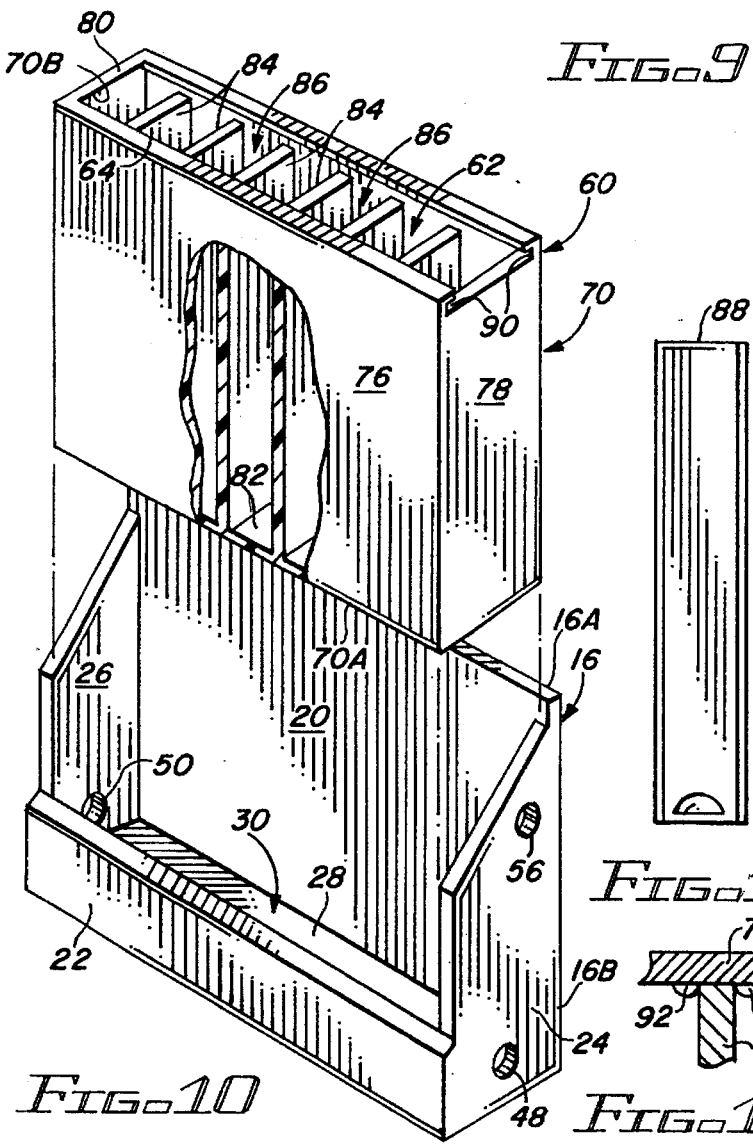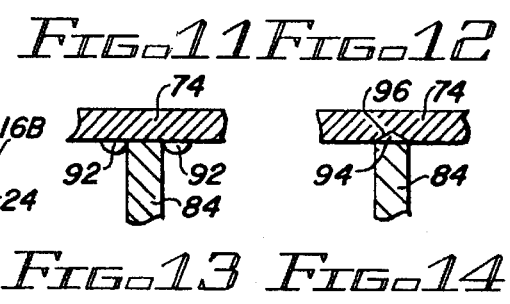

ARTICLE EMPLOYING MODIFIED MUSICAL RECORDING TAPE CARTRIDGE STORAGE CASE FOR STORING SMALL LOOSE ITEMS

CROSS REFERENCE TO RELATED APPLICATION

This application is a continuation-in-part of U.S. application Ser. No. 08/395,054, filed Feb. 27, 1995, now abandoned.

BACKGROUND OF THE INVENTION

1. Field of the Invention

The present invention generally relates to storage containers, and more particularly, is concerned with a novelty article which employs a modified musical recording tape cartridge storage case which may store small loose items as well as contain an insert card displaying a favorite recording artist of the user.

2. Description of the Prior Art

One common form of packaging musical recordings for sale to consumers is a cassette tape cartridge packaged with a J-shaped insert card in a rectangular storage case. The storage case is formed of a pouch-like body with a lid hinged to the body. Representative examples of cassette tape storage cases are disclosed in Schoenmakers U.S. Pat. No. 3,272,325 and Kagano U.S. Pat. No. 4,913,287.

The lid of the storage case is defined by a main wall and an auxiliary wall interconnected to and spaced from an end portion of the main wall by a pair of side walls and an end wall so as to define a pocket along one end of the lid for removably inserting a tape cartridge therein and a J-shaped insert card therein between the tape cartridge and the interior of the lid.

The body of the storage case is defined by an end wall and a pair of side walls and a main wall connected and extending outwardly from the end wall. The main wall is relieved or cut away so that the auxiliary wall of the lid will lie in the relief and thus in the plane of the main wall of the case body and the end wall of the lid will close an open end of the body.

The insert card of the storage case typically displays a picture of the recording artist whose music is recorded on the tape cartridge contained in the case. In many instances this picture or portrait of the recording artist is aesthetically pleasing and a source of pride to the consumer of the musical recording.

However, up to the present time, the consumer has been limited to the employment of these storage cases only as a storage vehicle for the musical recording cartridge tape. The inventor herein has perceived that a need exists to expand the function of these musical recording storage cases with their insert cards so as to provide other benefits to consumers.

SUMMARY OF THE INVENTION

The present invention provides a novelty article for storing small loose items which is designed to satisfy the aforementioned needs. The novelty article of the present invention incorporates a modified musical recording tape cartridge storage case which may contain an insert card displaying a particular recording artist that is a favorite of the consumer. The article thus provided by the present invention is specifically adapted for use in storing small loose items.

Accordingly, the present invention is directed to a novelty article in the form of a modified musical recording tape cartridge storage case for storing small loose items. The novelty article comprises: (a) a lid having a main front wall, an auxiliary back wall, a pair of side walls and an end wall disposed between and interconnecting an end portion of the main front wall to the auxiliary back wall so as to define a pocket located adjacent to and along a first end of the lid; (b) means on the lid for defining an elongated enclosed compartment extending from the pocket to an open end of the compartment located adjacent to and along a second end of the lid opposite from the first end thereof; and (c) a body having a pair of side walls, an end wall extending between and connected to corresponding first ends of the side wall and a main back wall connected at one end to and extending outwardly from the end wall and connected to and extending between the side walls and defining an open end of the body opposite from the end wall of the body. The main back wall adjacent to the opposite open end of the body is relieved so as to define a void extending between corresponding second opposite ends of the side walls such that with the lid and body disposed in a closed position with respect to one another the auxiliary back wall of the lid lies in the void and in coplanar relationship with the main back wall of the body, the end wall of the lid closes the open end of the body, and the elongated enclosed compartment is enclosed by the side walls and end wall of the body and disposed between the main back wall of the body and the main front wall of the lid.

In a first embodiment of the novelty article, the enclosed compartment defining means is in the form of an extension of the auxiliary back wall of the lid which is connected at one end with the auxiliary back wall and extends between and is connected to the side walls of the lid. The auxiliary back wall extension and side walls of the lid terminate at an opposite end just short of other end of the main front wall of the lid so as to leave a protruding lip exposed thereon which overlaps with the end wall of the body when the lid and body are disposed in the closed condition with respect to one another.

In a second embodiment of the novelty article, the enclosed compartment defining means is in the form of a separate insert receptacle which fits at its closed end into the pocket of the lid and extends therefrom to an opposite open end disposed adjacent to the other end of the main front wall of the lid. The insert receptacle terminates at its open end just short of the other end of the main front wall of the lid so as to leave the protruding lip exposed thereon which overlaps with the end wall of the body when the lid and body are disposed in the closed condition with respect to one another. The insert receptacle has interconnected front and rear walls and a pair of opposite side walls with an end wall closing the one end thereof and may include a plurality of spaced partitions which divides the compartment into individual slots and a cover slidably movable along a track defined between the front and rear walls at the open end of the insert receptacle.

Also, the lid has a pair of projections, each projection being formed on the exterior of a respective one of the side walls of the lid. The body has a pair of holes, each hole being defined through a respective one of the side walls of the body adjacent the open end thereof and located so as to permit the passage of the projections of the lid through the holes so as to define a hinge between the lid and body pivotally attaching the lid and body to one another. The lid further has complementary detent means spaced from the hinge and located on the exterior of each side wall of the lid and on the interior of each side wall of the body which are mateable so as to releasably retain the lid and the body in the closed position.

The novelty article further comprises an insert card and a key chain attachment tab. The insert card is folded to fit snugly into the pocket of the lid and has indicia thereon which is viewable through the transparent material of the lid. The key chain attachment tab is connected to the exterior of the end wall of the body relatively closer to the first side wall than to the second side wall thereof and has an aperture therein for the passage of a key chain.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a perspective view of a first embodiment of a novelty article of the present invention for storing small loose items, the novelty article being shown in a closed condition.

FIG. 2 is a perspective view of the novelty article of FIG. 1 being shown in an opened condition.

FIG. 3 is an exploded perspective view of a lid and body of the novelty article.

FIG. 4 is an enlarged sectional view of the body of the novelty article taken along line 4—4 of FIG. 3.

FIG. 5 is an enlarged sectional view of the lid of the novelty article taken along line 5—5 of FIG. 3.

FIG. 6 is an enlarged sectional view of the novelty article taken along line 6—6 of FIG. 2.

FIG. 7 is an enlarged sectional view of the novelty article taken along line 7—7 of FIG. 1.

FIG. 8 is a perspective view of a second embodiment of a novelty article of the present invention for storing small loose items, the novelty article being shown in an opened condition with a slidable cover removed.

FIG. 9 is an enlarged exploded sectional view of a lid and insert receptacle of the novelty article taken along line 9—9 of FIG. 8.

FIG. 10 is an exploded perspective view of the lid and insert receptacle of the novelty article of FIG. 8.

FIG. 11 is an enlarged top plan view of the slidable cover of the novelty article of FIG. 8.

FIG. 12 is an enlarged bottom plan view of the slidable cover of the novelty article of FIG. 8.

FIG. 13 is a fragmentary sectional view of the novelty article showing a first embodiment of an arrangement for removably mounting the partitions in the insert receptacle.

FIG. 14 is another fragmentary sectional view of the novelty article showing a second embodiment of the arrangement for removably mounting the partitions in the insert receptacle.

DETAILED DESCRIPTION OF THE INVENTION

Referring to the drawings, there is illustrated in FIGS. 1 and 2 a first embodiment of the novelty article 10 of the present invention and in FIG. 8 a second embodiment thereof. The primary use of the novelty article 10 is for storing small loose items, such as pills and the like. In both embodiments, the novelty article 10 includes a case 12 which is a modified form of a prior art musical recording tape cartridge storage case and, preferably, also includes a J-shaped insert card 14 which is identical to that provided with such prior art storage case. While the novelty article 10 is primarily for use in storing small loose items, it can serve other unspecified ancillary functions as may become apparent to those skilled in the art.

Referring to the first embodiment in FIGS. 1–7 and the second embodiment in FIGS. 8–10, the parts of the case 12 of the novelty article 10 will be described with reference to the orientation of the article 10 as shown in FIGS. 2 and 8. The case 12 basically includes a lid 16 and a body 18 which are of substantially the same construction as comparable parts of the prior art musical recording tape cartridge storage case. The lid 16 of the case 12 is defined by a main front wall 20 and an auxiliary back wall 22 interconnected to and spaced from an end portion 20A of the main front wall 20 by a pair of right and left side walls 24, 26 and an end wall 28 so as to define a pocket 30 along one end of the lid 16.

The body 18 of the case 12 is defined by an end wall 32, a pair of right and left side walls 34, 36, and a main back wall 38. The end wall 32 is connected to and extends between corresponding first opposite ends of the right and left side walls 34, 36. The main back wall 38 is connected to and extends outwardly from the end wall 32 and is connected to and extends between the right and left side walls 34, 36 and defines an open end 40 of the body 18 opposite from the end wall 32. The main back wall 38 adjacent to the open end 40 is relieved or cut away so as to define a void 42 extending between corresponding second opposite ends of the right and left side walls 34, 36 such that, with the lid 16 and body 18 disposed in a closed position with respect to one another as seen in FIGS. 1 and 7, the auxiliary back wall 22 of the lid 16 lies in the void 42 and in coplanar relationship with the main back wall 38 of the body 18 and the end wall 28 of the lid 16 closes the open end 40 of the body 18. The auxiliary back wall 22 of the lid 16 therefore becomes a portion of the main back wall 38 of the body 18 when the case 12 is closed.

Referring to FIGS. 1, 2, 5 and 6, the body 18 of case 10 additionally has a pair of projections 44, 46, each being located on and projecting outwardly from the interior side of a respective one of the right and left side walls 34, 36 of the body 18. The lid 16 also has a pair of holes 48, 50, each being formed through a respective one of the right and left side walls 24, 26 of the lid 16 and located so as to permit the passage of the projections 44, 46 of the body 18 through the holes 48, 50 so as to define a hinge 52 pivotally attaching the lid 16 to the body 18 for movement between opened and closed positions relative thereto. Also, the second opposite ends of the right and left side walls 34, 36 of the body 18, located adjacent the void 42 and having the projections 44, 46 formed thereon, can be flexed slightly in order to assemble and disassemble the body 18 and lid 16 to and from one another by correspondingly inserting and withdrawing the projections 44, 46 into and from the holes 48, 50 in the right and left side walls 24, 26 of the lid 16.

Referring to FIGS. 1, 2 and 5, the lid 16 also has complementary detent means 54, spaced from the hinge 52, on the exterior of the respective right and left side walls 24, 26 of the lid 16 and the interior of the respective right and left side walls 34, 36 of the body 18. The complementary detent means 54 are releasably mateable so as to releasably retain the lid 16 and body 18 in the closed position shown in FIGS. 1 and 7. By way of example, the complementary detent means 54 can be a pair of protruding dimples 56 formed on the respective right and left side walls 24, 26 of the lid 16 and a pair of depressions 58 on the right and left side walls 34, 36 of the body 18.

The modification made to the case 12 of the novelty article 10 with respect to both embodiments thereof, which is not found in the prior art storage case, is a means 60 on the lid 16 for defining an elongated enclosed compartment 62 extending from the pocket 30 in the lid 16 to an open end 64 of the compartment 62 located adjacent to and along the other end 16A of the lid 16 opposite from the one end 16B thereof. The compartment 62 is enclosed by the right and left side walls 34, 36 and end wall 32 of the body 18 and is disposed between the main back wall 38 of the body 18 and the main front wall 20 of the lid 16 when the lid 16 and body 18 are in the closed position shown in FIGS. 1 and 7.

In the first embodiment of the novelty article shown in FIGS. 1–7, the enclosed compartment defining means 60 is in the form of an extension 66 of the auxiliary back wall 22 of the lid 16 which is connected at one end 66A with the auxiliary back wall 22 and extends between and is connected to the right and left side walls 24, 26 of the lid 16. The auxiliary back wall extension 66 and right and left side walls 24, 26 of the lid 16 terminate at an opposite end 66B just short of other end 16B of the lid 16 on the main front wall 20 thereof so as to leave a protruding lip 68 exposed thereon which overlaps with the end wall 32 of the body 18 when the lid 16 and body 18 are disposed in the closed condition with respect to one another as seen in FIGS. 1 and 7.

In the second embodiment of the novelty article 10 shown in FIGS. 8–12, the enclosed compartment defining means 60 is in the form of a separate insert receptacle 70 which removably fits at its closed end 70A into the pocket 30 of the lid 16 and extends therefrom to an opposite open end 70B disposed adjacent to the other end 16B of the lid 16 on the main front wall 20 thereof. The insert receptacle 70 terminates at its open end 70B just short of the other end 16B of the lid 16 on the main front wall 20 thereof so as to leave a protruding lip 72 exposed thereon which overlaps with the end wall 32 of body 18 when the lid 16 and body 18 are disposed in closed condition with respect to one another.

Also, the insert receptacle 70 preferably has interconnected front and rear walls 74, 76 and a pair of opposite right and left side walls 78, 80 with an end wall 82 closing the one end 70A thereof. The insert receptacle 70 may also include a plurality of spaced partitions 84 which divides the compartment 62 into individual slots 86 and a cover 88 slidably movable along a track 90 defined between the front and rear walls 74, 76 along the open end 70B of the insert receptacle 70. The partitions 84 may be permanently installed in the compartment 62 in any suitable manner known to one of ordinary skill in the art or removably secured therein using any suitable arrangement. For example, as seen in FIG. 13, pairs of spaced dimples 92 can be provided on the inside surfaces of the front and rear walls 74, 76 of the insert receptacle 70 (only one pair of dimples 86 on the rear wall 76 being shown) for removably slidably mounting the partitions 84 between the dimples. Alternatively, as seen in FIG. 14, pairs of slidably interfitting tongues 94 and grooves 96 can be provided on the opposite longitudinal edges of the partitions 84 and inside surfaces of the front and rear walls 74, 76 of the insert receptacle 70 for removably slidably mounting the partitions 84 in the compartment 62.

The insert card 14 is contained in the pocket 30 of the lid 16. The insert card 14 has a plurality of sections 14A, 14B, 14C partly folded relative to one another and snugly fitted against the interiors of the main front wall 20, auxiliary back wall 22 and end wall 28 and thus within pocket 30 of the lid 16. Further, as is well-known, the insert card 14 typically has indicia imprinted thereon, such as subject matter illustrating a picture or portrait of a recording artist. In the first embodiment, the insert card 14 also extends through the compartment 62 while in the second embodiment it extends partially about the outside of the insert receptacle 70.

The body 18 of the case 12 additionally has a key chain attachment tab 98 connected to the exterior of the end wall 32 of the body 18 relatively closer to the right side wall 34 than to the left side wall 36 of the body 18. The tab 98 has an arcuate surface projecting outward from and returning inward to the end wall 32. The tab 98 further has an aperture 100 formed therein for the passage of a key chain. The aperture 100 is formed by a cylindrical wall located at the center of the tab 98.

The lid 16 and body 18 of the case 12 are preferably, although not necessarily, made of any suitable transparent plastic material.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. An article for storing small loose items, said article comprising:

(a) a lid having a main front wall, an auxiliary back wall, a pair of side walls and an end wall disposed between and interconnecting an end portion of said main front wall to said auxiliary back wall so as to define a pocket located adjacent to and along a first end of said lid;

(b) means on said lid defining an elongated enclosed compartment extending from said pocket to an open end of said compartment located adjacent to and along a second end of said lid opposite from said first end thereof; and (c) a body having a pair of side walls, an end wall extending between and connected to corresponding first ends of said side wall and a main back wall connected at one end to and extending outwardly from said end wall and connected to and extending between said side walls and defining an open end of said body opposite from said end wall of said body, said main back wall adjacent to said opposite open end of said body being relieved so as to define a void extending between corresponding second opposite ends of said side walls such that with said lid and body disposed in a closed position with respect to one another said auxiliary back wall of said lid lies in said void and in coplanar relationship with said main back wall of said body, said end wall of said lid closes said open end of said body, and said elongated enclosed compartment is enclosed by said side walls and end wall of said body and disposed between said main back wall of said body and said main front wall of said lid;

(d) wherein said enclosed compartment defining means is a separate insert receptacle which fits at a closed end into said pocket of said lid and extends therefrom to an opposite open end disposed adjacent to an opposite other end of said main front wall of said lid;

(e) wherein said insert receptacle terminates at said open end thereof just short of said other end of said main front wall of said lid so as to leave a protruding lip exposed thereon which overlaps with said end wall of said lid and body are disposed in said closed condition with respect to one another;

(f) wherein said insert receptacle has interconnected front and rear walls and a pair of opposite side walls with an end wall closing said one end thereof;

(g) wherein said insert receptacle includes a plurality of spaced partitions dividing the compartment into individual slots.

2. The article of claim 1 further comprising:

an insert card having a plurality of sections partly folded relative to one another and fitted snugly against respective interiors of said main front wall, end wall and auxiliary back wall of said lid and thus into said pocket of said lid.

3. The article of claim 1 wherein said enclosed compartment defining means is an extension of the auxiliary back wall of the lid which is connected at one end with the auxiliary back wall and extends between and is connected to the side walls of the lid.

4. The article of claim 3 wherein said auxiliary back wall extension and side walls of said lid terminate at an opposite end just short of other end of the main front wall of the lid so as to leave a protruding lip exposed thereon which overlaps with the end wall of the body when the lid and body are disposed in the closed condition with respect to one another.

5. The article of claim 3 further comprising:

an insert card having a plurality of sections partly folded relative to one another and fitted snugly with said pocket and said enclosed compartment defining means against respective interiors of said main front wall, said end wall, said auxiliary back wall and said auxiliary back wall extension of said lid.

6. The article of claim 1 further comprising:

a key chain attachment tab connected to an exterior of said end wall of said body relatively closer to said first side wall than to said second side wall thereof, said key chain attachment tab having an aperture therein for passage of a key chain.

7. The article of claim 1 wherein said lid has a pair of projections thereon, each of said pair of projections being formed on and projecting outwardly from an interior side of a respective one of said pair of side walls of said body adjacent to the open end thereof.

8. The article of claim 7 wherein said body has a pair of holes, each of said pair of holes being defined through a respective one of said pair of side walls of said lid and located so as to permit passage of said projections of said body through said holes of said lid so as to define a hinge between said lid and body pivotally attaching said lid and body to one another.

9. The article of claim 8 wherein said lid has complementary detent means spaced from said hinge and on an exterior side of each of said pair of side walls of said lid and on an interior side of each of said pair of side walls of said body, said detent means being mateable so as to releasably retain said lid and said body in said closed position.

10. The article of claim 9 wherein said detent means is a protruding dimple formed on said exterior side of said each of said side walls of said lid and a depression formed on said interior side of said each of said side walls of said body.

11. An article for storing small loose items, said article comprising:

(a) a lid having a main front wall, an auxiliary back wall, a pair of side walls and an end wall disposed between and interconnecting an end portion of said main front wall to said auxiliary back wall so as to define a pocket located adjacent to and along a first end of said lid;

(b) means on said lid defining an elongated enclosed compartment extending from said pocket to an open end of said compartment located adjacent to and along a second end of said lid opposite from said first end thereof; and (c) a body having a pair of side walls, an end wall extending between and connected to corresponding first ends of said side wall and a main back wall connected at one end to and extending outwardly from said end wall and connected to and extending between said side walls and defining an open end of said body opposite from said end wall of said body, said main back wall adjacent to said opposite open end of said body being relieved so as to define a void extending between corresponding second opposite ends of said side walls such that with said lid and body disposed in a closed position with respect to one another said auxiliary back wall of said lid lies in said void and in coplanar relationship with said main back wall of said body, said end wall of said lid closes said open end of said body, and said elongated enclosed compartment is enclosed by said side walls and end wall of said body and disposed between said main back wall of said body and said main front wall of said lid;

(d) wherein said enclosed compartment defining means is a separate insert receptacle which fits at a closed end into said pocket of said lid and extends therefrom to an opposite open end disposed adjacent to an opposite other end of said main front wall of said lid;

(e) wherein said insert receptacle terminates at said open end thereof just short of said other end of said main front wall of said lid so as to leave a protruding lip exposed thereon which overlaps with said end wall of said body when said lid and body are disposed in said closed condition with respect to one another;

(f) wherein said insert receptacle has interconnected front and rear walls and a pair of opposite side walls with an end wall closing said one end thereof;

(g) wherein said insert receptacle also includes a cover slidably movable along a track defined between said front and rear walls at said open end of said insert receptacle.

12. The article of claim 11 further comprising:

an insert card having a plurality of sections at least partly folded relative to one another and fitted partially over the exterior of said insert receptacle and snugly against respective interiors of said main front wall, end wall and auxiliary back wall of said lid of said case and thus into said pocket of said lid.

13. The article of claim 11 wherein said enclosed compartment defining means is an extension of the auxiliary back wall of the lid which is connected at one end with the auxiliary back wall and extends between and is connected to the side walls of the lid.

14. The article of claim 13 wherein said auxiliary back wall extension and side walls of said lid terminate at an opposite end just short of other end of the main front wall of the lid so as to leave a protruding lip exposed thereon which overlaps with the end wall of the body when the lid and body are disposed in the closed condition with respect to one another.

15. The article of claim 13 further comprising:

an insert card having a plurality of sections partly folded relative to one another and fitted snugly with said pocket and said enclosed compartment defining means against respective interiors of said main front wall, said end wall, said auxiliary back wall and said auxiliary back wall extension of said lid.

16. The article of claim 11 further comprising:

a key chain attachment tab connected to an exterior of said end wall of said body relatively closer to said first side wall than to said second side wall thereof, said key chain attachment tab having an aperture therein for passage of a key chain.

* * * * *